United States Patent [19]
Bartlett, Jr.

[11] Patent Number: 5,943,814
[45] Date of Patent: Aug. 31, 1999

[54] LOBSTER TRAP RUNNERS

[76] Inventor: J. Pike Bartlett, Jr., CR69 Box 477, Friendship, Me. 04547

[21] Appl. No.: 08/955,655

[22] Filed: Oct. 22, 1997

[51] Int. Cl.[6] .................................................... A01K 69/08
[52] U.S. Cl. .................................................. 43/104; 43/65
[58] Field of Search ................................. 43/58, 60, 100, 43/103, 105, 104, 94, 65; D22/121; 119/226, 228, 238, 452, 480, 488, 496

[56] References Cited

U.S. PATENT DOCUMENTS

| | | |
|---|---|---|
| D. 365,135 | 12/1995 | Elliott .................................... D22/121 |
| 878,820 | 2/1908 | Murdoch . |
| 2,530,449 | 11/1950 | Bush ......................................... 43/102 |
| 4,147,130 | 4/1979 | Goguel ....................................... 119/3 |
| 4,486,973 | 12/1984 | Faucillon ................................. 43/100 |
| 5,839,220 | 11/1998 | Wass ........................................ 43/105 |

*Primary Examiner*—Jack W. Lavinder
*Attorney, Agent, or Firm*—William Nitkin

[57] ABSTRACT

A wire mesh lobster trap having a pair of concrete runners positioned on, and extending below, the side edges of the trap and a method for producing same are disclosed.

5 Claims, 3 Drawing Sheets

LOBSTER TRAP RUNNERS

BACKGROUND OF THE INVENTION

1. Field of the Invention

This invention resides in the field of lobster traps and more particularly relates to concrete runners that are formed on the wire mesh of the lobster trap.

2. Description of the Prior Art

Lobster traps typically have "ballast" which are often three or four clay or concrete bricks fastened inside each trap. The function of ballast is to add weight to the trap to keep it from moving on the ocean floor and to help the trap sink "right side up." Traps also have "runners," normally two, which are usually hardwood strips attached to the underside of the trap, which wood strips perform a skid function, protecting the bottom of the trap from the substantial abrasion that traps are subjected to on the rocky ocean floor, but such wood strips are buoyant and must be counterweighted by the brick ballast. The runners also protect the gunwale of a boat as the trap is dragged onboard over the gunwale from being scratched and abraded by contact between the traps and the gunwale.

Wire lobster traps are also quite susceptible to bending, especially on a side of the trap having a head opening or openings. "Heads" are the interior net structures that allow lobsters to enter the trap and are designed to prevent the lobsters from escaping. Up to one-third of the side of the wire mesh trap can be cut away for such head openings to allow lobsters' entry into the trap. This cutting away of the wire mesh creates a substantial weakening of the side of the trap, leading to flexure and bending of the wire mesh.

U.S. Pat. Des. 365,135 to Elliott discloses a lobster trap skid that is fastened in pairs to the bottom of a trap, but which skid does not strengthen the wire mesh of the lobster trap to which it is attached.

U.S. Pat. No. 2,530,449 to Bush describes a crab trap having a concrete block attached to the base of the trap. The wire, though, of the crab trap extends beneath the block, thereby eliminating any skid function of the block as the wire of the trap would contact the gunwale of the boat or the ocean floor.

Great Britain Patent 1,505,354 describes a trap having a metal frame that facilitates sinking of the trap, the frame acting as a weight under certain conditions, but no skid function is disclosed.

Canadian Patent 672,575 describes a trap having tubular members which are filled with cement, helping to interlock arcuate members with transverse base members, but such traps have little structurally in common with the wire mesh lobster traps now in use.

SUMMARY OF THE INVENTION

It is an object of this invention to provide lobster trap runners made of high strength concrete, where the concrete is molded into the bottom side edges of the trap. By molding the concrete onto the bottom of the wire mesh trap, the trap acquires improved structural strength. To overcome the bending problem discussed above, concrete is molded with the bottom of the corner wires of the trap therein along the entire length of the trap on two opposing sides. The wire mesh is held securely, and the trap is thus reinforced because the concrete provides resistance to the bending of the wire mesh along the length of both sides of the trap.

It is a further object of this invention to provide lobster trap runners of sufficient weight so that the trap has a low center of gravity, causing the trap to land upright on the ocean floor. There will also be less "drag" or resistance to movement through the water on the bottom of the trap when using the runners of this invention, helping the trap sink right side up.

It is yet a further object of this invention to provide lobster trap runners having a skid function, thereby providing a longer life than traditional wood runners. Such longevity is due first to the fact that concrete runners are not susceptible to worms which eat wood runners. Secondly, the concrete runners of this invention do not utilize nails or staples used to fasten prior art wood runners to the trap which fasteners tended to have a life of only two to five years.

It is yet a still further object of this invention to provide a lobster trap which will cause less damage and mutilation to lobsters inside the trap due to the elimination of bricks being used as ballast. In prior art traps lobsters can get caught between shifting bricks used as ballast or between such bricks and the side of a trap or caught between the brick and a head in the trap, causing damage to the lobsters.

It is yet a still further object of this invention to provide permanent identification of the traps through imprinting a name and/or license number of the owner in the wet concrete during the formation of the runners.

DESCRIPTION OF THE PREFERRED EMBODIMENT(S)

Figure 1:
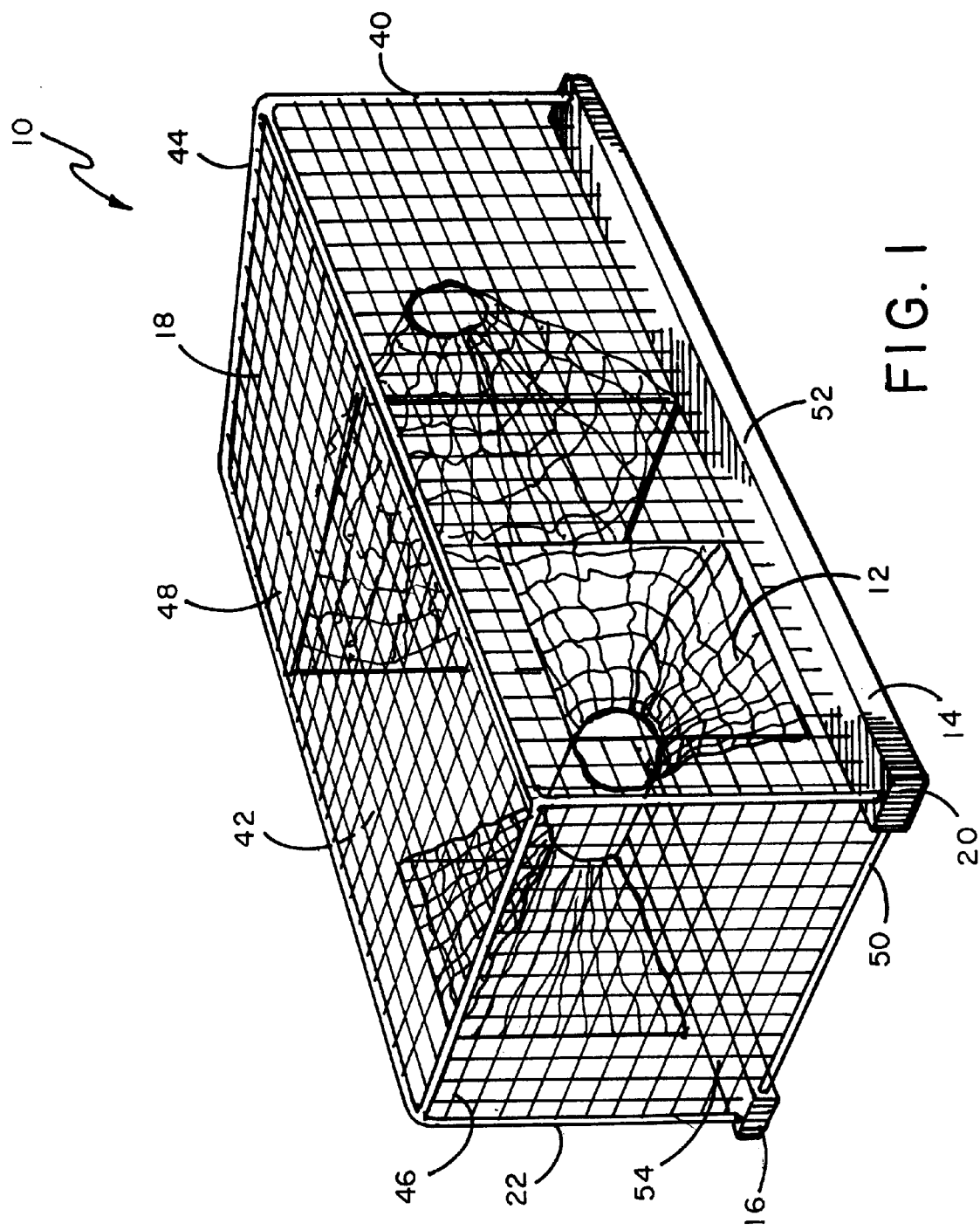
FIG. 1 illustrates a perspective view of a lobster trap with the runners of this invention installed thereon.

FIG. 1 illustrates a perspective view of lobster trap 10 having first and second sides 40 and 42, rear end 44, front end 46, top 48 and bottom base 50. Trap 10 is generally box-like in shape formed of wire mesh 18. Frame 22, if present, is formed of wire and can be thicker than wire mesh 18. Lobster trap 10 can be formed without a frame from wire mesh sections joined together. Seen on the sides of trap 10 are head openings, such as opening 12, through which lobsters can enter the trap. Other head openings can be formed in the trap sides. First and second runners 14 and 16 are formed, respectively, on first and second lower side edges 52 and 54 at the base of trap on first and second sides 40 and 42.

Figure 2:
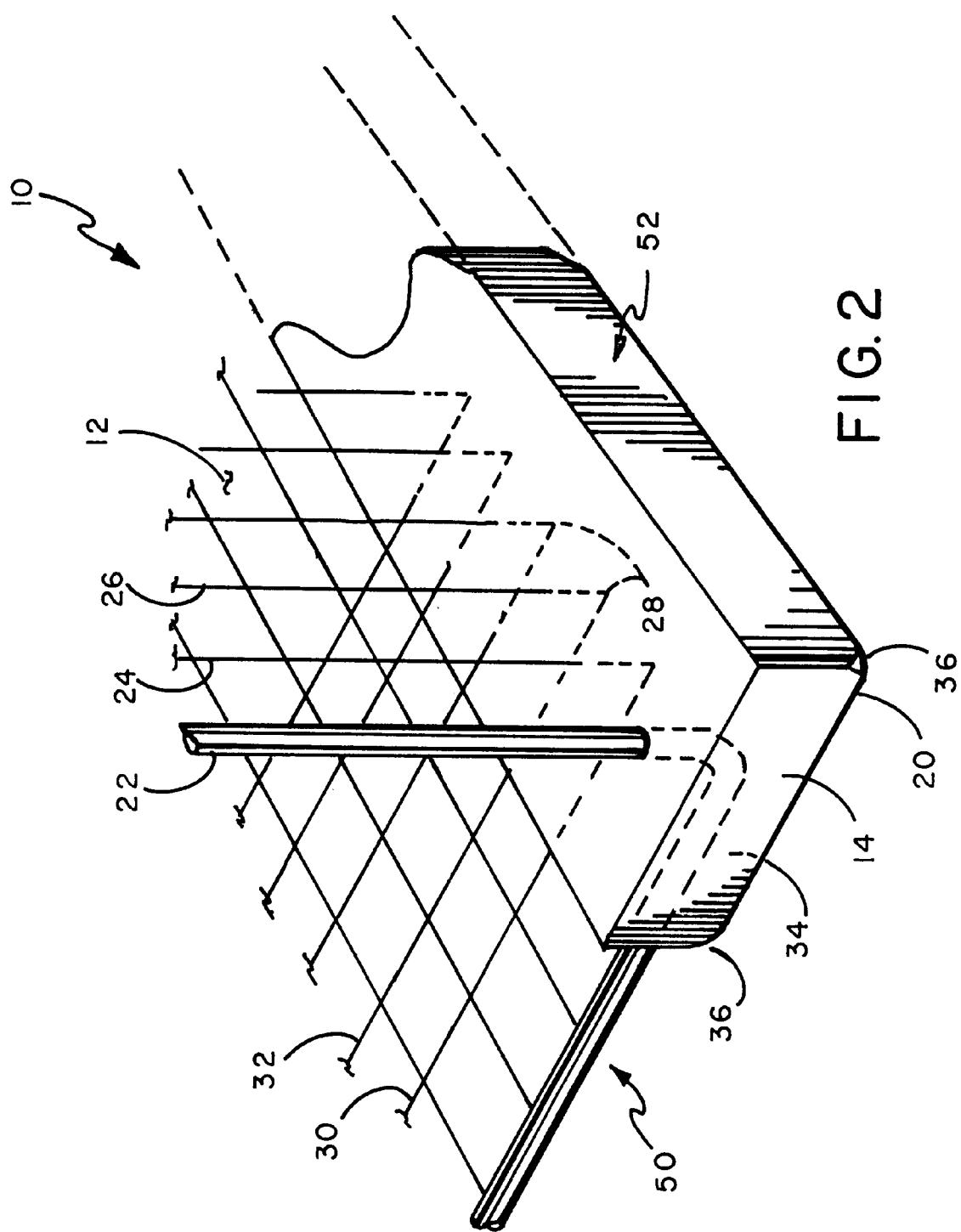
FIG. 2 illustrates a perspective enlarged sectional view of an end of one of the runners illustrated in FIG. 1.

FIG. 2 illustrates an enlarged view of the front portion of first runner 14. As seen in this view, first runner 14, in a preferred embodiment, can be generally rectangular in shape, having rounded comers 36 at each end to prevent catching of the runners on the gunwale of a boat onto which the trap is loaded. First runner 14 can be made of concrete and is molded onto the bottom of trap 10 at lower side edge 52. The concrete is molded around the bottom comers of the wire mesh trap along the entire length of both side edges of the trap. Concrete first runner 14 extends outward beyond and below comers 28 of the wire mesh of frame 22 and extends rearward along the lower side edge of the trap. For example, at the comers of the trap where wire 24 meets wire 30 and where wire 26 meets wire 32, the mesh is embedded in concrete, forming first runner 14. By covering all the wires at the base of the side edges of trap 10 and extending therebelow, the concrete runners of this invention can perform a skid function, protecting the trap's wire mesh from abrasion caused by contact with the rocky ocean floor as well as protecting the gunwales of a boat from scratching due to contact with bare wire mesh. Bottom 20 of runner 14 is generally smooth and can be flat or rounded as well has have identification indicia molded therein.

Figure 3:
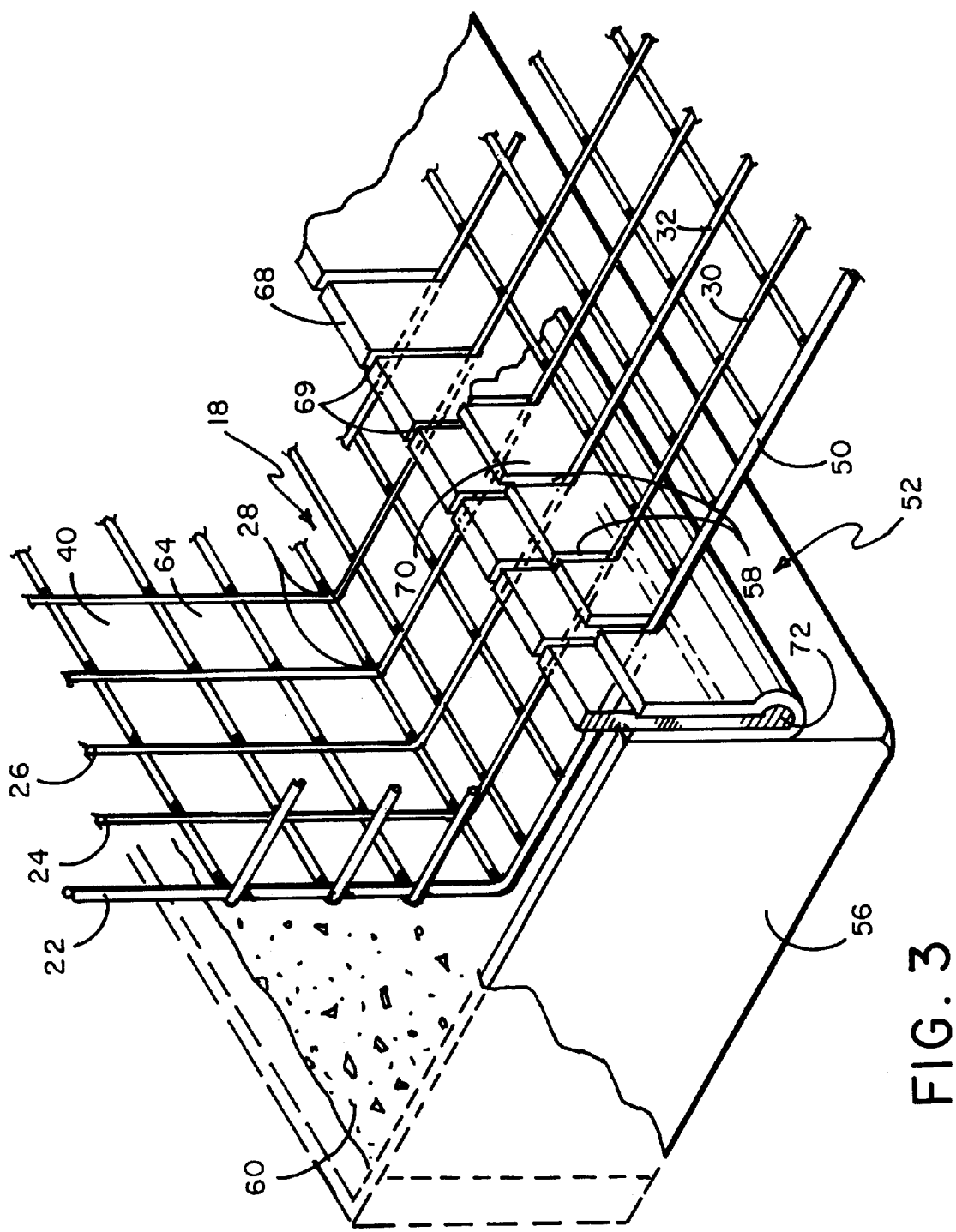
FIG. 3 illustrates a perspective enlarged sectional view of a mold casting of a runner in place.

The concrete runners of this invention can be made of high-strength concrete and molded, as seen in FIG. 3, onto the bottom side edges of the trap, extending slightly below the trap's wire mesh, also extending inwardly and outwardly on the outer side of the side edges of the trap. Mold 56, seen in FIG. 3, can be used to form one of the runners. It can be made of metal, such as aluminum, or rubber or other equivalent material in which the mold can be fabricated. Defined within the sides of mold 56 are slots 58 corresponding in thickness to the thickness of the mesh wire of the lobster trap and spaced apart a corresponding distance to receive the wire mesh, each adjacent wire within such adjacent slots 58. The narrowness of slots 58 helps prevent the thick consistency of the concrete from leaking out mold 56. In some embodiments an inner rubber-like dam 68 can be positioned behind the slots in mold 56. Dam 68 can have a plurality of narrow slots 69 aligned with slots 58. Narrow slots 6, which can even have the slot sides contact one another, help in holding the concrete in mold 56. Dam 68 can be slid into channel 72 formed in mold 56. The wire of the trap can be oiled to act as a lubricant to more easily pass into slots 69. By embedding corners 28 of wire mesh 18 along the trap's parallel first and second lower side edges 52 and 54, concrete first and second runners 14 and 16 serve to reinforce the strength of the trap by holding wire mesh 64 securely and preventing bending or flexure along the length of the trap especially near head openings 12. First and second runners 14 and 16 also act as ballast without the accompanying problems associated with traditional lobster trap ballast, such as bricks discussed above, by imparting a low center of gravity to the trap which helps the trap land correctly on the ocean floor.

Although the present invention has been described with reference to particular embodiments, it will be apparent to those skilled in the art that variations and modifications can be substituted therefor without departing from the principles and spirit of the invention.

I claim:

1. A lobster trap of the type formed from a wire mesh forming a box-like structure including four sides, a bottom and a top, at least one opening in at least one of said sides to admit lobsters, first and second lower side edges interconnected with said wire mesh bottom, each of said first and second lower side edges being substantially parallel and formed by the junction of the bottoms of the said sides of said wire mesh structure and the said wire mesh bottom comprising:

first and second runners molded of concrete, said first and second runners encasing, respectively, a portion of said first and second lower side edges of said wire mesh sides and a portion of said wire mesh bottom, said runners extending below said wire mesh bottom and forming combination weights and runners defining the bottommost surface of said trap.

2. The trap of claim 1 wherein said first and second weight-runners are generally elongated and rectangular in shape.

3. The trap of claim 2 wherein said first and second weight-runners have a substantially smooth bottom surface.

4. The trap of claim 3 wherein said first and second runners are each formed as a result of pouring concrete in a mold positioned around a lower side edge of said wire mesh and a portion of said base thereby defining combination weight-runners for said trap.

5. A combination weight and runner on a lobster trap made of wire mesh, said trap having first and second sides including first and second lower side edges and a bottom having sides contiguous with said lower side edges of said sides, comprising:

a rectangular elongated combination weight and runner made of concrete, said concrete encasing a lower side edge and an adjacent portion of said base, said concrete extending below said wire mesh of said base.

\* \* \* \* \*